(12) United States Patent
De Schepper et al.

(10) Patent No.: US 9,979,652 B2
(45) Date of Patent: May 22, 2018

(54) INTERMEDIATE NODE, AN END NODE, AND METHOD FOR AVOIDING LATENCY IN A PACKET-SWITCHED NETWORK

(71) Applicant: Provenance Asset Group LLC, Essex, CT (US)

(72) Inventors: Koen De Schepper, Edegem (BE); Ing-Jyh Tsang, Waasmunster (BE)

(73) Assignee: Provenance Asset Group LLC, Essex, CT (US)

(*) Notice: Subject to any disclaimer, the term of this patent is extended or adjusted under 35 U.S.C. 154(b) by 0 days. days.

(21) Appl. No.: 14/902,627

(22) PCT Filed: Jul. 29, 2014

(86) PCT No.: PCT/EP2014/066269
§ 371 (c)(1),
(2) Date: Jan. 4, 2016

(87) PCT Pub. No.: WO2015/014833
PCT Pub. Date: Feb. 5, 2015

(65) Prior Publication Data
US 2016/0182376 A1 Jun. 23, 2016

(30) Foreign Application Priority Data
Aug. 2, 2013 (EP) .................................... 13290185

(51) Int. Cl.
*H04L 12/801* (2013.01)
*H04L 12/825* (2013.01)
(Continued)

(52) U.S. Cl.
CPC .......... *H04L 47/12* (2013.01); *H04L 43/0882* (2013.01); *H04L 47/115* (2013.01);
(Continued)

(58) Field of Classification Search
None
See application file for complete search history.

(56) References Cited

U.S. PATENT DOCUMENTS

| | | | |
|---|---|---|---|
| 2003/0133411 A1* | 7/2003 | Ise | H04L 12/5695 370/230 |
| 2004/0148423 A1 | 7/2004 | Key et al. | |

(Continued)

FOREIGN PATENT DOCUMENTS

| | | |
|---|---|---|
| EP | 1441288 A2 | 7/2004 |
| WO | WO-2009/113106 A2 | 9/2009 |

OTHER PUBLICATIONS

International Search Report PCT/ISA/210 for International Application No. PCT/EP2014/066269 dated Dec. 3, 2014.
(Continued)

*Primary Examiner* — Charles C Jiang
*Assistant Examiner* — Rose Clark
(74) *Attorney, Agent, or Firm* — Dinsmore & Shohl LLP (57) ABSTRACT

The present invention is related to an intermediate node, an end node, and method for avoiding latency in a packet-switched network.

According to the invention, the maximum bandwidth per flow is determined locally and transferred from the sending node to the receiving node. At each node, the information is updated if a lower local value is computed. By adjusting the transmission rate based on the maximum bandwidth per flow receiving at the receiving node, the link capacity can be optimally utilized and congestion can be minimized.

14 Claims, 3 Drawing Sheets

(51) Int. Cl.
*H04L 12/26* (2006.01)
*H04L 29/06* (2006.01)
*H04L 12/833* (2013.01)

(52) U.S. Cl.
CPC ............ *H04L 47/26* (2013.01); *H04L 47/263* (2013.01); *H04L 69/22* (2013.01); *H04L 47/18* (2013.01); *H04L 47/29* (2013.01); *H04L 47/31* (2013.01); *Y02B 60/31* (2013.01)

(56) References Cited

U.S. PATENT DOCUMENTS

| | | | | |
|---|---|---|---|---|
| 2005/0213504 | A1* | 9/2005 | Enomoto | H04L 41/142 370/235 |
| 2006/0239286 | A1* | 10/2006 | Schneider | H04L 12/5695 370/412 |
| 2011/0032935 | A1* | 2/2011 | Yang | H04L 47/10 370/389 |
| 2011/0076331 | A1 | 3/2011 | Bayerl | |
| 2014/0016461 | A1* | 1/2014 | Ishikawa | H04L 47/17 370/230 |

OTHER PUBLICATIONS

Written Opinion of the International Searching Authority PCT/ISA/237 for International Application No. PCT/EP2014/066269 dated Dec. 3, 2014.

Brett J. Vickers et al., "Source-Adaptive Miltilayered Milticast Algorithms for Real-Time Video Distribution", ACM Transactions on Networking, ACM, New York, NY, vol. 8, No. 6, Dec. 1, 2000.

Liew H S et al., "Approximate fair bandwidth sharing in high-speed multimedia networks", BT Technology Journal, Kluwer Academic Publishers, DO, vol. 24, No. 2, Apr. 1, 2006, p. 85-89.

* cited by examiner

INTERMEDIATE NODE, AN END NODE, AND METHOD FOR AVOIDING LATENCY IN A PACKET-SWITCHED NETWORK

CROSS-REFERENCE TO RELATED APPLICATIONS

This application is a national phase under 35 U.S.C. § 371 of PCT International Application No. PCT/EP2014/066269 which has an International filing date of Jul. 29, 2014, which claims priority to European Application No. 13290185.1, filed Aug. 2, 2013, the entire contents of each of which are hereby incorporated by reference.

The present invention is related to an intermediate node, an end node, and method for avoiding latency in a packet-switched network.

A packet-switched network typically comprises an end node, such as a sending node or a receiving node, and a plurality of intermediate nodes. The intermediate nodes are mutually coupled by links to facilitate the routing of packet flows between sending nodes and receiving nodes. Here, a link is the physical connection between two nodes, which can be intermediate nodes and/or end nodes. One or more links can be combined to form a path between a sending node and a receiving node. Each link can have different characteristics in terms of maximum bandwidth it can support.

Typically there are many sending nodes and receiving nodes connected to many of the intermediate nodes. The intermediate nodes form a meshed network, and a pair of end nodes typically behave as a sending node and receiving node of a packet flow. Different packet flows may share the same path. However, the same pair of end nodes may communicate different packet flows over different paths. Moreover, the forward and reverse paths may differ and both paths may change with time.

The path between one pair of end nodes may not be the same as that of another pair of end nodes. Moreover, different links typically have different flows going through them.

To avoid congestion of the path, one should avoid that the local maximum bandwidth of every link in the path is not exceeded by the different packet flows that are carried by those links.

Current congestion control mechanisms in packet-switched networks depend on queuing building up to detect congestion. For instance, an output queue before a link will accommodate a plurality of packets for different flows. When this queue, most often implemented as a buffer memory, is full, packets will be dropped.

Typically, congestion is detected by inspecting the length of the queue. This can be achieved by estimating the delay it induces, or by assuming that the queue is full if a packet loss is detected, e.g. when no acknowledge message is received. This means that a considerable queue must have been built up before congestion of a link can be detected with enough certainty. This queuing can cause considerable latency for the sending of packets.

To solve the abovementioned problem, active queue management (AQM) has been proposed in the art. In this approach, packets are dropped or marked before the queue is full. Typically, they operate by maintaining one or more drop/mark probabilities, and probabilistically dropping or marking packets even when the queue is short. By providing endpoints with congestion indication before the queue is full, a relatively shorter queue length can be maintained thereby reducing network latency. In practice, it has been proven difficult to configure the queue thresholds correctly avoiding queue buildup while supporting high utilization.

There is a continuing desire to achieve an optimal utilization of the costly hardware within a network. This requires knowledge about how the available bandwidth in the network is utilized. Unfortunately, it has been found that temporary queue build-up is not always a reliable source to indicate utilization.

It is therefore an object of the present invention to provide an alternative congestion control by which a better utilization of the available links in a network can be achieved while avoiding or reducing queuing.

According to a first aspect, this object has been achieved with a method as defined in claim 1.

The method according to the invention comprises, at an intermediate node, receiving packets to be transported by a first link, one or more packets, preferably belonging to the same packet flow, having encoded therein information regarding a maximum bandwidth per flow, and extracting the information. The first link corresponds to an outgoing link of the intermediate node. Furthermore, this maximum bandwidth provides an estimation of the maximum bandwidth that can be achieved or that is allowed per flow in an earlier link in the path before significant transmission degradation occurs. Alternatively, if the packet(s) is/are not identified as belonging to a particular flow, the maximum bandwidth per flow could represent a bandwidth for the flow of that/those packet(s) or it represents a function, such as a weighted average, of the flows of the packet(s).

The intermediate node determines the bandwidth utilized by the packet flows for the first link. For the first link, the bandwidth, for instance expressed in bytes per second, can be determined by adding the sizes of all the packets that are carried by the first link over a time interval, divided by that time interval. Other known techniques for determining the bandwidth can use a sliding time window, or by using an exponential weighted moving average technique.

At the intermediate node, preferably at a regular interval, a maximum bandwidth per flow is calculated using the determined utilized bandwidth, a predefined target bandwidth, and a previously calculated maximum bandwidth per flow. This does not exclude that a combination, such as an exponential weighted moving average, of a series of previously calculated maximum bandwidths per flow is used. The calculation may be subjected to limits. For instance, the newly calculated maximum bandwidth per flow may not exceed the target bandwidth. Such situation may occur if the current link is not fully utilized because for all or some flows passing that link, a bottleneck exists at another node in the network.

Next, the calculated maximum bandwidth per flow is compared with the maximum bandwidth per flow derived from the extracted information. In case this encoded maximum bandwidth per flow is lower than the calculated maximum bandwidth per flow the current intermediate node may forward the packet(s), preferably in a traditional manner.

If the calculated bandwidth per flow is lower than the maximum bandwidth per flow encoded in the packet(s), the calculated maximum bandwidth per flow is communicated to the sending node(s) corresponding to the packet flows. This allows the sending node to adjust a transmission rate such that congestion can be prevented or reduced.

Communicating the calculated maximum bandwidth per flow may comprise encoding the calculated maximum bandwidth in one or more packets to be sent to a next node in the path(s) of the packet flows. In the next node, e.g. an intermediate node, a similar comparison can be made. In this way, information regarding the bottleneck in the network is propagated to the receiving node.

The predefined target bandwidth may depend on the properties of the physical link between the current node and the next node. It may be stored at the node or it is sent remotely to that node. Alternatively, the amount of spare capacity may be adapted based on aggregate behavior of the flows passing the link previously in time. Typically, the target bandwidth is lower than the actual maximum bandwidth that a link can support to allow for spare capacity. For some types of links, such as wireless mobile links or links carrying variable higher priority traffic, the capacity can change over time, so also the target capacity may change over time, depending on the changes in link capacity.

The method may further comprise the sending node communicating an initial maximum transmission rate per flow as the maximum bandwidth per flow to a next node in the path. Such rate may for instance be related to the rate at which data to be transmitted becomes available in the sending node. During successive iterations of the method according to the invention, the maximum transmission rate may be adapted to account for bottlenecks within the network. However, the sending node may encode a maximum bandwidth per flow in one or more packets it sends, which maximum may be related to the physical link it uses to send the packets. This maximum could correspond to the maximum transmission rate with which the sending node can output packets over the link.

The method may further comprise the receiving node communicating the maximum bandwidth per flow encoded in the packet(s) it has received to the sending node, the sending node adjusting its maximum transmission rate in accordance with the maximum bandwidth it has received. The receiving node may receive the maximum bandwidth per flow as determined by the last intermediate node in the path or it may receive this information directly from the intermediate node(s). That bandwidth provides an estimate of the bandwidth per packet flow that the path between sending node and receiving node should be able to handle. By sending this information to the sending node, the latter is able to adjust its transmission rate accordingly. Hence, congestion is prevented or reduced by dynamically adjusting the transmission rate based on local information pertaining to the local link utilization. Such link may be locally stressed because it locally carries an excessive amount of packet flows.

The maximum bandwidth per flow and/or the maximum transmission rate may be communicated by adding corresponding information in a packet header and/or packet payload of at least one packet to be sent over the first link, said at least one packet preferably belonging to the same packet flow. Preferably, such information is added to the packet header. For a given packet flow, the information may not necessarily be added to each packet in the flow. Moreover, in the case wherein several packet flows are transported over the same link, it may not be required that the information has been added to each packet flow. It is important that the node on the receiving end of a link, being an end node or intermediate node, is able to extract the required information from the packet(s) it receives.

Instead of using headers of protocols that are already in use, such as the TCP, UDP, DCCP or SCTP protocols, a dedicated control protocol may be used in which the information can also be transported in the payload part of a packet.

Another option to communication the maximum bandwidth per flow and/or the maximum transmission rate comprises encoding corresponding information using a plurality of packets to be sent over the first link, preferably by setting at least one predetermined bit in a packet header, wherein the number of packets for which the predetermined bit is set correlates with the maximum bandwidth per flow and/or the maximum transmission rate.

The setting of the at least one predetermined bit constitutes a marking of a packet. The intermediate node can also mark packets irrespective of the packet flows the packets belong to. For instance, the intermediate node may mark 1 out of every 10 packets it sends over the first link. These 10 packets may or may not be distributed over a plurality of different flows. The next node can derive information regarding the maximum bandwidth per flow using the distance, measured in packets or time, between at least two successive marked packets or using the ratio between the number of marked and unmarked packets. The maximum bandwidth per flow can for instance be reduced by the intermediate node by marking extra unmarked packets, such that the desired marking rate or marking distance is achieved.

The method may further comprise the intermediate node replacing and/or updating the encoded information regarding the maximum bandwidth per flow prior to forwarding these packet(s), if the calculated bandwidth per flow is lower than the maximum bandwidth per flow derived from the extracted information. For instance, if a received packet contains information that the maximum bandwidth per flow for a previous link is 100 MB/s, whereas the maximum bandwidth per flow for the first link is 50 MB/s, the former information may be replaced, for instance by means of packet capturing and processing techniques which are known in the art.

The maximum bandwidth per flow (Rpf) can be calculated using $Rpf = U \times Rpf\_p / BW$, wherein BW is the determined utilized bandwidth, $Rpf\_p$ a previously calculated maximum bandwidth per flow, and U the predefined target bandwidth. The method may further comprise estimating the number of flows (#f) per link in accordance with $\#f = BW / Rpf\_p$.

A distinction can be made between highly responsive flows and barely responsive flows. Here, a highly responsive flow is a flow which, in contrary to a barely responsive flow, reacts strongly to an increase in available bandwidth within a link. A barely responsive flow may for instance be a flow that is application limited in the sense that the transmission rate is determined not by the available bandwidth but by the rate at which the data becomes available or by is limited by an other bottleneck on the path.

The method may comprise estimating the number of highly responsive flows and/or barely responsive flows and/or the corresponding utilized bandwidth(s) by these flows. The calculation of the maximum bandwidth per flow may be performed by taking into account that a difference between the target bandwidth and a previously determined utilized bandwidth will at least to a large extent be used by the highly responsive flows. For instance, when a node detects that it has spare capacity it can determine the increase in maximum bandwidth per flow based on the number of highly responsive flows as only those flows will react to an increase in maximum bandwidth per flow.

The highly responsive and barely responsive flows can be taken into account using the previously calculated maximum bandwidth per flow ($Rpf\_p$), a maximum bandwidth per flow ($Rpf\_pp$) calculated previously to said previously calculated maximum bandwidth per flow, a previously determined utilized bandwidth (BW_p) and a currently determined utilized bandwidth (BW).

The number of active flows is preferably determined in accordance with #fa=(BW−BW_p)/(Rpf_p−Rpf_pp), wherein the maximum bandwidth per flow may be calculated using Rpf=(U−BL)/#fa. Here, BL is the combined bandwidth of the barely responsive flows, which is preferably computed using BL=BW−#fa×Rpf_p.

The intermediate node may be communicatively coupled to a plurality of different next nodes corresponding to different paths using respective links, each link being capable of accommodating a plurality of flows. In this case, the method for avoiding latency according to the invention can be separately performed per link. Any single internal bottleneck in the node, aggregating flows coming from different links, to be sent to other different links, can also be seen as a link and can be treated accordingly.

According to a second aspect, the invention provides an intermediate node for a packet-switched network, which comprises a packet reception unit for receiving one or more packets to be sent over a first link having encoded therein information regarding a maximum bandwidth per flow, and a packet analyzing unit for extracting said information. It further comprises a bandwidth determining unit for determining the bandwidth utilized by the packet flows for the first link.

The node also comprises a processing unit for calculating a maximum bandwidth per flow using the determined utilized bandwidth, a predefined target bandwidth, and a previously calculated maximum bandwidth per flow, and for comparing the calculated maximum bandwidth per flow with the maximum bandwidth per flow derived from the extracted information.

The node also has a communication unit for communicating the calculated maximum bandwidth per flow as the maximum bandwidth per flow to the sending node(s) corresponding to the packet flows, preferably by encoding the calculated maximum bandwidth in one or more packets to be sent to a next node in the path(s) of the packet flows.

According to the invention, the processing unit is configured to control the communication unit to communicate the calculated maximum bandwidth per flow if the calculated bandwidth per flow is lower than the maximum bandwidth per flow encoded in the one or more packets.

The communication unit may be controlled by the processing unit if the calculated bandwidth per flow is lower than the maximum bandwidth per flow encoded in the one or more packets to communicate the maximum bandwidth per flow as defined above. Moreover, the processing unit may preferably be further configured to implement the various calculation methods as defined above. Here, the intermediate node may be a network router or a network switch.

According to a third aspect, the invention provides a receiving node which comprises a packet reception unit for receiving one or more packets having encoded therein information regarding a maximum bandwidth per flow, a packet analyzing unit for extracting the information, preferably per flow after the packets are separated per flow, and a communication unit for communicating the maximum bandwidth per flow to at least one sending node that has sent the one or more packets.

According to a fourth aspect, the invention provides a sending node which comprises a packet reception unit for receiving one or more packets corresponding to a packet flow having encoded therein information regarding a maximum bandwidth per flow, a packet analyzing unit for extracting the information, and a packet pacer for pacing packets to be sent to a next node, which packets belong to the packet flow, wherein the pace at which packets are sent is set in accordance with the maximum bandwidth per flow.

According to a fifth aspect, the invention provides a network node, wherein the network nodes comprises:

a packet reception unit for receiving one or more packets to be sent over a first link having encoded therein information regarding a maximum bandwidth per flow;

a packet analyzing unit for extracting said information;

a bandwidth determining unit for determining the bandwidth utilized by the packet flows for the first link;

a processing unit for calculating a maximum bandwidth per flow using the determined utilized bandwidth, a predefined target bandwidth, and a previously calculated maximum bandwidth per flow, and for comparing the calculated maximum bandwidth per flow with the maximum bandwidth per flow derived from the extracted information;

a communication unit for communicating the calculated maximum bandwidth per flow as the maximum bandwidth per flow to sending node(s) corresponding to the packet flows, preferably by encoding the calculated maximum bandwidth in one or more packets to be sent to a next node in a path or paths of the packet flows;

wherein the processing unit is configured to control the communication unit to communicate the calculated maximum bandwidth per flow if said calculated bandwidth per flow is lower than the maximum bandwidth per flow encoded in the one or more packets.

According to a sixth aspect, the invention provides a network node that comprises:

a reception unit for receiving one or more packets having encoded therein information regarding a maximum bandwidth per flow;

a packet analyzing unit for extracting said information, preferably per flow after the packets are separated per flow;

a communication unit for communicating the maximum bandwidth per flow to at least one sending node that has sent the one or more packets.

According to a seventh aspect, the invention provides a network node comprising:

a packet reception unit for receiving one or more packets corresponding to a packet flow having encoded therein information regarding a maximum bandwidth per flow;

a packet analyzing unit for extracting said information;

a packet pacer for pacing packets to be sent to a next network node, which packets belong to said packet flow, wherein the pace at which packets are sent is set in accordance with the maximum bandwidth per flow.

According to an eight aspect, the invention provides a method for avoiding latency in a packet-switched network, the method comprising:

at an intermediate node, receiving packets to be transported by a first link, one or more packets, preferably belonging to the same packet flow, having encoded therein information regarding a maximum bandwidth per flow, and extracting said information;

at the intermediate node, determining the bandwidth utilized by the packet flows for the first link;

at the intermediate node, calculating a maximum bandwidth per flow using the determined utilized bandwidth, a predefined target bandwidth, and a previously calculated maximum bandwidth per flow;

comparing the calculated maximum bandwidth per flow with the maximum bandwidth per flow derived from the extracted information;

if said calculated bandwidth per flow is lower, communicating the calculated maximum bandwidth per flow as the maximum bandwidth per flow to sending node(s) corresponding to the packet flows.

Next, the invention will be described in more detail referring to the appended drawings, in which.

Figure 1:
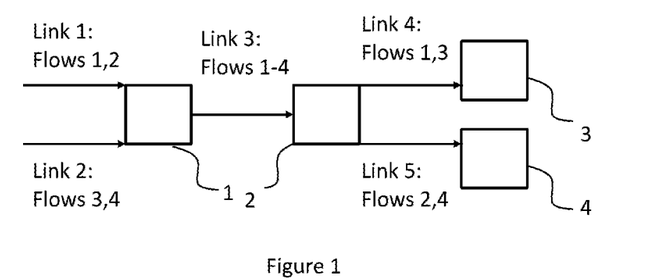
FIG. 1 illustrates a small section of a packet-switched network in which the current invention has been embodied.

FIG. 1 illustrates a small section of a packet-switched network in which the current invention has been embodied. A first intermediate node 1 is receiving packets corresponding to packet flows 1 and 2 over link 1 with a previous node. It also is receiving packets corresponding to packet flows 3 and 4 over link 2 with a different previous node.

Intermediate node 1 determines the utilized bandwidth BW for link 3, that is it adds the sizes of the packets corresponding to flows 1-4 that are sent over link 3 to intermediate node 2 during a given time period, and divides the accumulated size by that time period to determine an average utilized bandwidth.

Packet flow 1 and/or 2 comprises information regarding the maximum bandwidth per flow. The same holds for packet flow 3 and/or 4, although this information is most likely different as it concerns a different path. Also flows 1 and 2 may have followed a different path in further previous nodes, as well as flow 3 and 4. The information comprised in the packets represents the maximum bandwidth per flow up to intermediate node 1 of the respective paths to which the respective flows belong.

In a first embodiment, to indicate the maximum bandwidth per flow, packets are marked by setting a predetermined field with a value that is the maximum bandwidth per flow divided by a unit bandwidth (for example 10 kbps). Intermediate node 1 can determine the maximum bandwidth per flow encoded in each packet by multiplying the value in the predetermined field by 10 kbps.

Intermediate node 1 has information regarding a target bandwidth U for link 3. This bandwidth is typically somewhat lower than the physical maximum bandwidth to allow for spare capacity.

Based on a previously determined maximum bandwidth per flow for link 3, Rpf_p, a new maximum bandwidth per flow can be determined using Rpf=U×Rpf_p/BW.

If this value is lower than the value determined for a packet arriving for link 3, the value is replaced and further communicated to intermediate node 2.

Next, an example will be described how the effects of congestion can be mitigated. In this example, it is assumed that flow 4 is a new flow compared to a previous moment in time when the maximum bandwidth per flow (Rpf_p) was computed to be 25 Mbps, and each of the flows 1-3 transported packets at this rate.

In this example the target bandwidth U of link 3 is 75 Mbps, whereas the maximum bandwidth is 100 Mbps. Assume that the bandwidth of packet flows 1, 2, 3, and 4 is 25, 25, 25, and 4 Mbps, respectively, as the 3 existing flows were converged to an equal share and the new flow has no information and starts with a safe value, and the packets for those flows have encoded values 4000, 4000, 5000 and 5000, respectively, as the bottleneck in the path of link 1 is 40 Mbps and on link 2 is 50 Mbps. The bandwidth of link 3 is measured to be 79 Mbps, based on the bandwidth received for all packets over an interval of time, which exceeds the target bandwidth.

Using the equation Rpf=U×Rpf_p/BW the new maximum bandwidth per flow can be computed to be 75×25/79=23.73 Mbps, resulting in a value of 2373. This information is less than the values encoded in the packets, and is replaced in the packets that are sent to intermediate node 2. When the information finally reaches the sending node, via intermediate nodes and the receiving node, the transmission rate may be adjusted. Assuming no other lower bottlenecks exist in the network, the transmission rate will be adapted such that each flow has a bandwidth of 23.73 Mbps. In a next iteration, the transmission rate will be further decreased to 18.75 Mbps as the utilized bandwidth (4×23.73 Mbps) will be still higher than the target bandwidth.

At intermediate node 2, packet flows 1 and 2 which used common links 1 and 3 are split over links 4 and 5 to reach next nodes 3 and 4, respectively, and to finally arrive at their respective receiving nodes. The same holds for flows 3 and 4.

As illustrated in FIG. 1, congestion is determined locally and depends on the packet flows that are carried over a particular link. When the target bandwidth of this link is exceeded, the transmission rate for the various flows using that link can be lowered to prevent or reduce the effects of congestion.

An important aspect of the present invention is the communication of the information concerning the maximum bandwidth per flow to the sending node which should use this to pace the rate of the packets. When this information is distributed over different packet flows that follow different paths in the network, only the minimum of this bandwidth on the path is received by the sending node as a value which can be identified by any sending node of a flow in the same way as a maximum bandwidth or pacing rate to apply for the flow.

In a second embodiment, to indicate the maximum bandwidth per flow, packets are marked by setting a predetermined bit. Intermediate node 1 can determine the distance between marked packets or it can determine the ratio between marked and unmarked packets. In this example we assume that a unit distance represents 1 Mbps and an average distance between packets is calculated by dividing the number of packets received by the number of marked packet received over a predetermined time interval. The distance is thus expressed as the ratio of the number of packets per marked packets, and the time interval is the averaging time interval.

Intermediate node 1 has information regarding a target bandwidth U for link 3. This bandwidth is typically somewhat lower than the physical maximum bandwidth to allow for spare capacity.

Based on an earlier determined maximum bandwidth per flow for link 3, Rpf_p, a new maximum bandwidth per flow can be determined using Rpf=U×Rpf_p/BW.

If this value is lower than the values determined for the packets arriving for link 3, extra markings will be applied to unmarked packets until the desired (average) marking distance or ratio is achieved and communicated to intermediate node 2. It may do so by marking a certain ratio of the packets to be sent over link 3, irrespective of the packet flow they belong to, similar to the way in which the information was provided to intermediate node 1.

Next, an example will be described how the effects of congestion can be mitigated. In this example, it is assumed that flow 4 is a new flow compared to a previous moment in time when the maximum bandwidth per flow (Rpf_p) was computed to be 25 Mbps, and each of the flows 1-3 transported packets at this rate.

In this example the target bandwidth U of link 3 is 75 Mbps, whereas the maximum bandwidth is 100 Mbps. Assuming that the bandwidth of packet flows 1, 2, 3, and 4 is 25, 25, 25, and 4 Mbps, respectively, as the 3 existing flows were converged to an equal share and the new flow has no information and starts with a safe value, the bandwidth of link 3 is measured to be 79 Mbps, based on the bandwidth received for all packets over an interval of time, which exceeds the target bandwidth. Assuming flows 1 and 2 passed a common bottleneck of 40 Mbps and flows 3 and 4 one of 50 Mbps, the packets were marked with a distance of 40, 40, 50 and 50, respectively. As a flow independent aggregate, the average distance of the packets measured on arriving at link 3 is the sum of all packet rates divided by the sum of all marked rates. The marked rate is the number of marked packets per second, or the packet rate divided by the distance (which is the packet per market packet ratio). In this example assuming 10 kilo bit per packet, the average distance at link 3 is thus: d=2500+2500+2500+400 pps/2500/40+2500/40+2500/50+400/50 mps=7900/183=43.2 ppm wherein the unit pps represents packets per second, mps the marked packets per second and ppm the packets per marked packet.

Using the equation Rpf=U×Rpf_p/BW the new maximum bandwidth per flow can be computed to be 75×25/79=23.73 Mbps. This information is less than the values encoded in the packets, and that are sent to intermediate node 2.

The marked packets per second is 183, where it should be 333 to achieve a distance of 23.73, so 150 marked packets per second are extra marked. As the flows of the packets are not identifiable by the intermediate nodes, the markings are distributed over the different flows based on their relative probability. Flows with a higher unmarked rate, i.e. the number of packets per second—marked packets per second, and flows with a higher packet rate will have a higher marking probability. In our example the distance of the flows will be 22.8; 22.8; 25.6 and 25.6 respectively.

When the information finally reaches the sending node, via intermediate nodes and the receiving node, the transmission rate may be adjusted. Assuming no other lower bottlenecks exist in the network, the transmission rate will be adapted such that each flow has a bandwidth of 22.8 or 25.6 Mbps. In a next iteration, the transmission rate will be further decreased to 17.6 and 19.2 Mbps as the utilized bandwidth (2×22.8+2×25.6 Mbps) will be higher than the target bandwidth.

At intermediate node 2, packet flows 1 and 2 which used common links 1 and 3 are split over links 4 and 5 to reach next nodes 3 and 4, respectively, and to finally arrive at their respective receiving nodes. The same holds for flows 3 and 4.

As illustrated in FIG. 1, congestion is determined locally and depends on the packet flows that are carried over a particular link. When the target bandwidth of this link is exceeded, the transmission rate for the various flows using that link can be lowered to prevent or reduce the effects of congestion.

An important aspect of the present invention is that the intermediate node does not need to determine the different flows, resulting in a good approximation for the rate per flow. Here, it is noted that the marking of packets irrespective of the packet flows makes use of the fact that different packet flows are rarely synchronized. In other words, the probability of marking a packet belonging to a particular packet flow depends on the relative bitrate, i.e. the bitrate of that packet flow divided by the sum of the bitrates of all incoming packet flows. Still, optionally the intermediate node can identify the different flows to encode a more precise minimum function of one bit over different packets.

Figure 2:
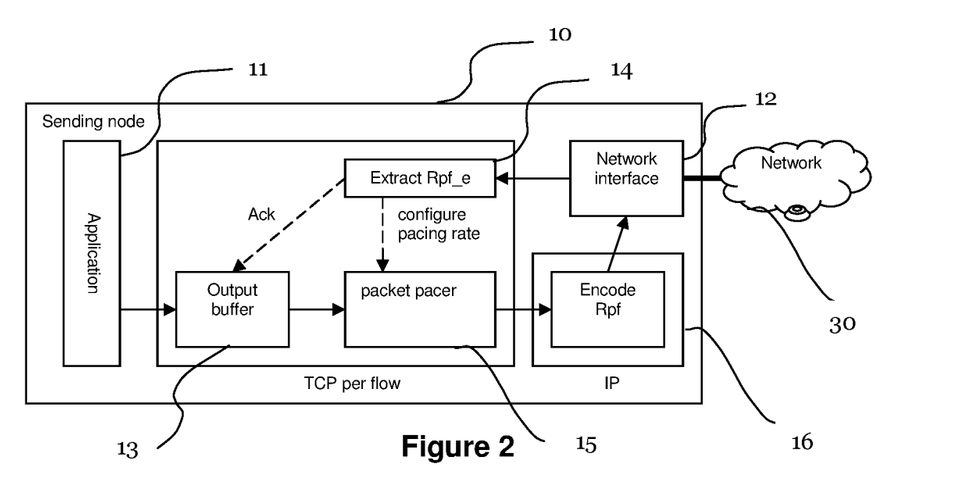
FIG. 2 illustrates an embodiment of a sending node.
Figure 3:
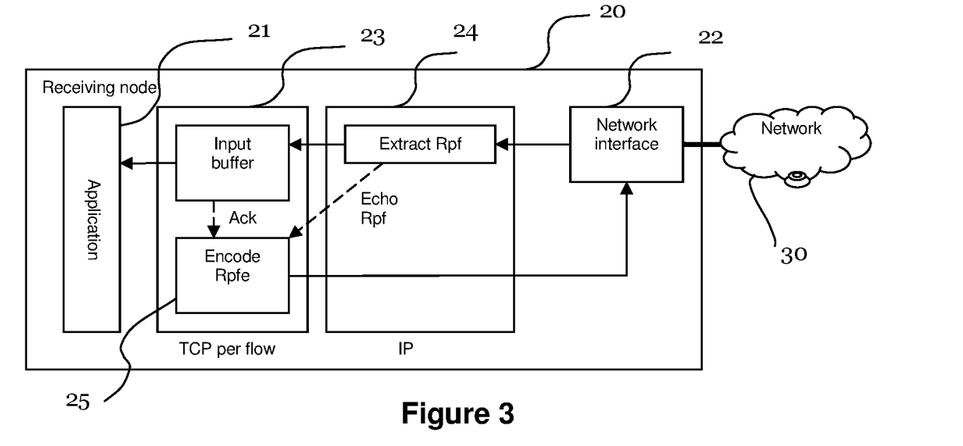
FIG. 3 illustrates an embodiment of a receiving node.

FIGS. 2 and 3 illustrate an embodiment of a sending node 10 and a receiving node 20, respectively, that are connected via a network 30. Within sending node 10 an application 11 is running that produces data to be transmitted to receiving node 20. Sending node 10 comprises a packet reception unit for receiving one or more packets corresponding to a packet flow having encoded therein information regarding a maximum bandwidth per flow. Such unit is incorporated in a network interface 12 that is configured for sending/receiving packets from network 30.

Data generated by application 11 is put in an output buffer 13 prior to transmission. As the TCP protocol is used, sending node 10 receives an acknowledge (ACK) message related to the sending of a packet by sending node 10. Such message is received by network interface 12.

In the embodiment in FIG. 2, the ACK message comprises a maximum bandwidth per flow (Rpf_e) value echoed by receiving node 20 in the payload of the ACK message. At the TCP level, the maximum bandwidth per flow is extracted using a package analyzing unit 14 per flow. This value is fed to a packet pacer 15 which paces the transmission of packets per flow, thereby defining the transmission rate per flow. FIG. 2 further illustrates that the maximum bandwidth per flow is encoded by an encoding unit 16 at the IP level, e.g. in a IP header, before the packet is sent to network 30 via interface 12. This encoded maximum bandwidth per flow will be preferably the maximum rate at which the network interface can send packets, to avoid bandwidth limitations at the sender if the network can support higher rates.

Similarly, receiving node 20 in FIG. 3 comprises an application 21 that is receiving packets. These packets are received by a packet reception unit for receiving one or more packets having encoded therein information regarding a maximum bandwidth per flow. Such unit is incorporated in a network interface 22. The received packets and fed to an input buffer 23 per flow. As shown in FIG. 3, the maximum bandwidth per flow is extracted by a packet analyzing unit 24 at the IP level, preferably from the corresponding IP header and per packet delivered to the correct flow. At the TCP level, ACK messages are generated to be transmitted to sending node 10. Within the payload of the ACK messages, the Rpf_e (echoed maximum bandwidth per flow) value is encoded by encoding unit 25. Subsequently, the ACK messages are sent to network 30 via network interface 22. Here, encoding unit 25 and the transmission part of network interface 22 form a communication unit that communicates the maximum bandwidth per flow.

The maximum bandwidth per flow (Rpf) to be modified by the intermediate nodes can be encoded in the header of the layer that the network node is manipulating, for instance the network IP layer in case of a router. If lower layers are used for example Layer 2 (L2), Layer 3 devices must propagate the minimum value from L2 and L3 to the L3 encoding. This means that the marking in L2 must be preserved in L3, as L3 devices consume the L2 headers and generate a new L2 header when sending out the packet. So they should take into account the minimum value of both L2, L3 and their local calculated value.

In the embodiment in FIGS. 2 and 3, an IP network is assumed and an IP option field is defined to carry the Rpf value. The data receiver will echo the received final maximum bandwidth per flow (Rpf_e) in a field of the protocol level that is handling the congestion control (typically the transport layer, or application layer). Also lower layers (such as L2 or L3) can facilitate propagation of echoed information from the receiver back to the sender. In FIG. 2, TCP is used and an echo option field is defined for it.

A new flow uses a safe for instance preconfigured initial value as the rate at which the packets are paced. When the first echoed per flow rate value (Rpf_e) is received, this bandwidth or rate will be used. Every packet is sent with Rpf_e as the maximum transmission rate that sending node 10. This value is reduced when intermediate network nodes estimate a lower maximum bandwidth per flow.

Figure 6:
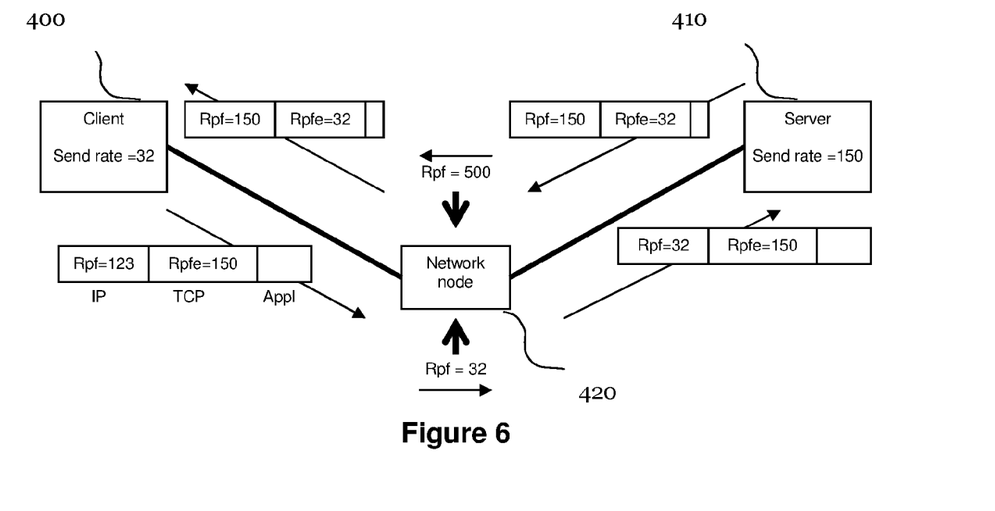
FIG. 6 illustrates the interaction of the packets between a client and a server via a router.

FIG. 6 shows the packets and their manipulation by an intermediate router 420 for both directions of TCP. As TCP can be used to send data in both directions, the packets and sender/receiver functionality is symmetric.

In FIG. 6, a client 400 sends packets at a rate of for instance 32 kbps, whereas a server 410 sends packets at a rate of 150 kbps. The link from the router to the server can handle a bitrate of 32 kbps, whereas the link from the router to the client can handle 500 kbps. Consequently, although the client could be able to transmit at a higher bitrate, the overall bitrate from the client to the server would be limited by the link from the router to the client. Still, this maximum transmission rate, e.g. 123 kbps, is sent in the network layer (IP) of packets transmitted by the client.

FIG. 6 illustrates a steady state situation wherein, using the method of the present invention, the transmission rate of the client has been adapted to avoid congestion. On the other hand, the server cannot send packets at a rate higher than 500 kbps but is limited at 150 kbps. This could be due to the fact that packets do not become available at a higher rate or because the link from the server to the router cannot handle such bitrates. Hence, the server sends out its maximum transmission rate encoded in the network layer (IP) of the packets. As the bottleneck is at the server itself, the client, acting as receiving node, receives this maximum transmission rate, and echoes the same in the transport layer (TCP) back to the server.

The router determines the utilized bandwidth of the link from the router to the server and determines that this bandwidth is lower than the maximum bandwidth per flow that is encoded in the network layer (IP) of the incoming packets. Being in a steady state, the utilized bandwidth BW is equal to the target bandwidth U, so that the newly calculated maximum bandwidth per flow Rpf is equal to the earlier calculated maximum bandwidth per flow Rpf_p, i.e. 32 kbps. As this value is lower than the value extracted from the packets, which is 123 kbps, the newly calculated maximum bandwidth per flow is encoded in the network layer (IP) of the packets that are forwarded by the router to the server.

As described above, both client and server act as a receiving node and as a sending node. Consequently, two different paths exists, one wherein the client is the sending node and the server the receiving node, and one wherein the situation is reversed. The method according to the present invention can be applied to both paths as will be described next.

The client, acting as receiving node, receives a final maximum bandwidth per flow (Rpf_e) encoded in the network (IP) layer of packets coming from the router. This information is sent back (echoed) in the transport layer (TCP) of packets sent back to the server, which acts as the sending node for this path. In addition, the client, as sending node, sends packets having encoded therein, in the network layer, the transmission rate of 32 kbps. The link between the router and the server.

Congestion does not occur for packets sent by the server to the client. The maximum bandwidth per flow encoded in the network layer (IP) does therefore not change when the packets are forwarded by the router.

Figure 4:
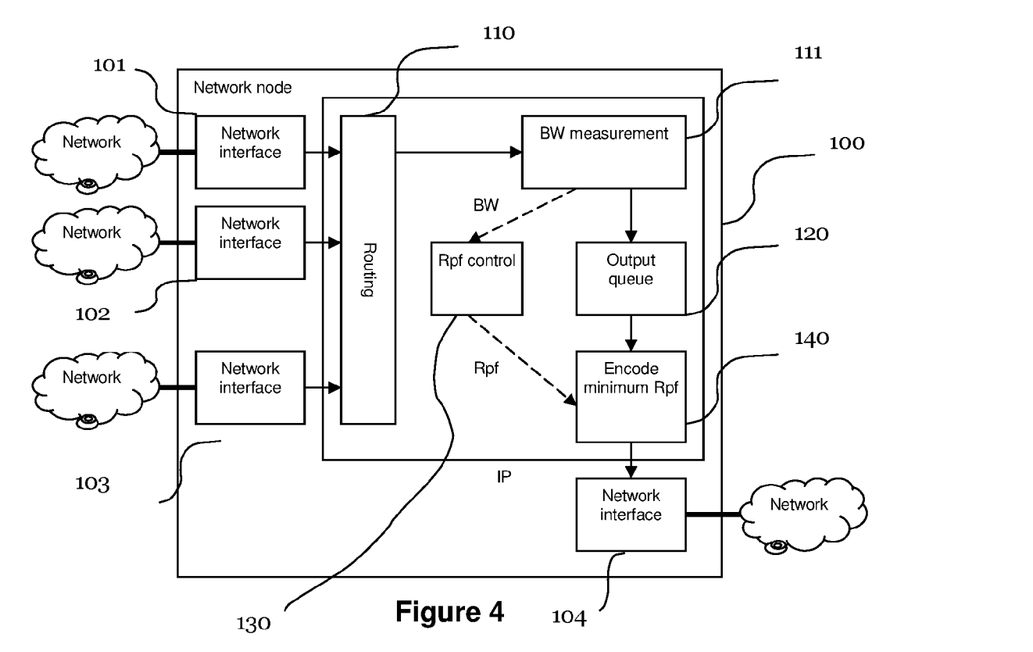
FIG. 4 illustrates an embodiment of an intermediate node.

FIG. 4 illustrates an embodiment of an intermediate node 100 according to the present invention. It comprises a plurality of network interfaces 101-104 for transmitting and receiving packets. Each network interface 101-103 comprises a packet reception unit for receiving one or more packets. Each network interface 101-104 is connected to a different link. A routing unit 110 performs the necessary operations to allow the packets to be routed.

A bandwidth measurement/determining unit 111 is configured to determine the utilized bandwidth per link Prior to being sent, packets are stored in an output queue 120. Intermediate network node 200 comprises a control unit 130 which comprises a packet analyzing unit for extracting information and a processing unit that is able to calculate the maximum bandwidth per flow for each link separately. An encoding unit 140 encodes the value for the maximum bandwidth per flow at the IP level, for instance in the IP header, prior to transmitting the packet to network 30 via network interface 104. It should be noted that FIG. 4 only illustrates a single BW measurement unit 111, control unit 130, output queue 120 and encoding unit 140 attached to network interface 104 for reasons of clarity. Another set of units is typically present for each interface or internal pipe that can be a bottleneck. Here, encoding unit 140 and the transmission part of network interface 104 form a communication unit that communicates the maximum bandwidth per flow.

Figure 5:
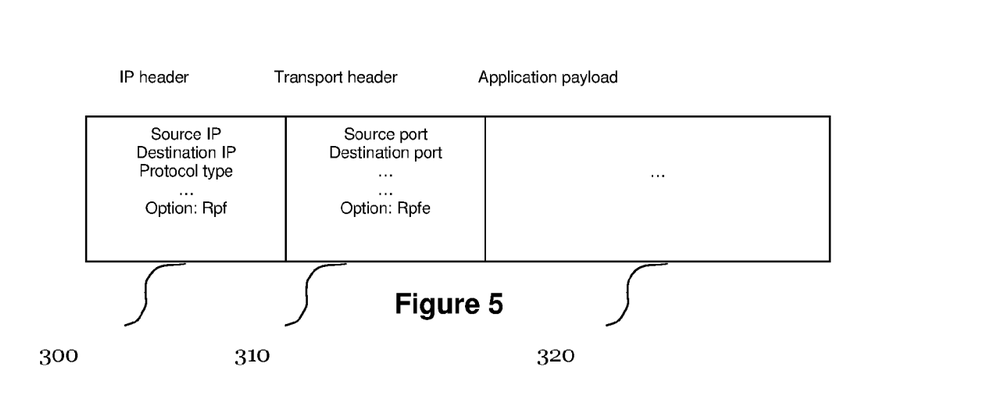
FIG. 5 illustrates an embodiment of a packet structure.

FIG. 5 illustrates an embodiment of a packet structure. Two headers are illustrated in which information required for the method of the invention can be carried. IP header 300 typically comprises the source and destination IP addresses, and the type of protocol that is used in the next layer.

IP header 300 encapsulates a header 310 for the transport layer, such as the TCP layer. Typically, this header comprises information regarding the ports of the source and destination. The packet further comprises a payload 320 that comprises application specific date.

As stated before, each intermediate node preferably communicates the calculates maximum bandwidth per flow (Rpf) in the IP header. At receiving node 20, the value received is echoed to sending node 10 as Rpf_e. This value can be encoded in the transport header or in an application payload. It can optionally be encoded in the IP header such that it can be used in the network at the IP layer for instance for measurements or congestion exposure.

Rpf may also be sent via a separate control protocol which uses a message packet which is sent from source to destination once per time interval. Upon receiving this message at receiving node 20, another return message packet is sent from receiving node 20 to echo the final Rpf value (Rpf_e) to sending node 10, which uses this value as a pacing rate to send packets. Optionally flow details can be provided in the control packet to allow path determination in case this is dependent on other flow parameters than source and destination host identification (IP address).

As a further alternative to communicate the required information, the maximum bandwidth per flow is encoded using a single bit in every packet that an intermediate nodes may mark. Bits are initially set to 0, and intermediate nodes can use the bits to report the Rpf as will be described next.

The distance between marked packets (d), and also the ratio of received packets divided by the received packets that are marked (d=packets/marked packets=r/m; where r is the rate in packets/s and m is the marked rate in marker-packets/s) is the measure for the Rpf that can be used. The Rpf value can be encoded as a constant value (k) times the marking distance, i.e. Rpf=k·d, although other functions are also possible such as Rpf=k/d or Rpf=k·exp(b).

The echoing of Rpf can be implemented by echoing the single bit, or by decoding the single bit out of the different received packets and sending it as a distance or Rpf value (numerical). In the first case the sender must decode the Rpf value out of the single echoed bits over the different packets. The decoder can smooth the distance or Rpf value by averaging the value over several marked packet periods.

Additional parameters may be passed from sending node 10 to receiving node 20, such as the round trip time (RTT=time between sending a data packet and receiving its acknowledgement packet), an indication whether the flow is starting/new, the currently applied transmission rate per flow, and/or the flow fraction multiplication factor (n), which indicates that a flow is behaving as n times a regular flow. These values can be used by the intermediate network nodes to improve the estimation of the Rpf to be sent towards the end node.

Flows may be allowed to use a factor (n>=0; n<a limit) of the predefined bandwidth Rpf, depending on criteria such as urgency, a weight, importance or required bandwidth. This allows flows to take a bigger or smaller share of the available bandwidth compared to an otherwise equal/fair share.

Typically, the points in time at which the intermediate nodes calculate the maximum bandwidth per flow are separated roughly by an amount that equals the roundtrip time.

According to the invention, to avoid latency it is proposed to avoid queuing and overutilization of the links Low latency networks should avoid 100% utility and go for a target utility below 100% of the bandwidth capacity. This will reduce the need for queuing and should result in only systematic queuing. This can be achieved by pacing the packets to the network, e.g. avoiding bursts, and allowing queues only when packets can come together from different links parallel in timing, and need to be serialized over an outgoing link.

Intermediate nodes will configure a safe target bandwidth (U), based on the preferred utility of the link, that allows enough free bandwidth for variations, and room for new flows and thus avoiding overutilization of the link. This target bandwidth can optionally be adaptively modified (learned) based on past and current behavior.

Alternative ways to define safeguarding spare capacity other than using the target bandwidth (U) in the manner defined above are:
- to define U as a predefined part of the capacity (C) of the link, e.g. 90%
- to define a number of spare flows (s): Rpf=U/(#f+s)
- a combination of both methods above, and/or
- taking the minimum from both methods above It should be apparent that modification and variations are possible without departing from the scope of the present invention which is defined by the appended claims.

The invention claimed is:

1. A method for avoiding latency in a packet-switched network, the network comprising a sending node, a receiving node, and a plurality of intermediate network nodes, the plurality of intermediate network nodes being mutually coupled by a plurality of links thereby forming paths for routing of packet flows between sending nodes and receiving nodes, the sending nodes including the sending node, the receiving nodes including the receiving node, the method comprising:
 - at an intermediate node among the plurality of intermediate network nodes, receiving one or more packets to be transported by a first link, the one or more packets belonging to the same packet flow having encoded therein information regarding a first maximum bandwidth per flow, and extracting the information;
 - at the intermediate node, determining the bandwidth utilized by the packet flows for the first link;
 - at the intermediate node, calculating a second maximum bandwidth per flow using the utilized bandwidth, a predefined target bandwidth, and a previously calculated maximum bandwidth per flow;
 - comparing the second maximum bandwidth per flow with the first maximum bandwidth per flow;
 - if the second bandwidth per flow is lower than the first maximum bandwidth per flow, communicating the second maximum bandwidth per flow as a communicated maximum bandwidth per flow to the sending node corresponding to the packet flows.

2. The method according to claim 1, wherein communicating the
 calculated maximum bandwidth per flow comprises encoding the calculated maximum bandwidth in one or more packets to be sent to a next node in the path(s) of the packet flows.

3. The method according to claim 1, further comprising the sending node communicating an initial maximum transmission rate per flow as the maximum bandwidth per flow to a next node in the path;
 the method further comprising the receiving node communicating the maximum bandwidth per flow encoded in the packet(s) it has received to the sending node, the sending node adjusting its maximum transmission rate in accordance with the maximum bandwidth it has received.

4. The method according to claim 1, wherein the communicating the second maximum bandwidth per flow includes encoding corresponding information in a packet header and/or packet payload of the one or more packets to be sent over the first link.

5. The method according to claim 1, wherein the communicating the second maximum bandwidth per flow comprises using a dedicated control protocol.

6. The method according to claim 1, wherein the communicating the second maximum bandwidth per flow comprises encoding corresponding information using a plurality of packets to be sent over the first link by setting at least one predetermined bit in a packet header, the plurality of packets including the one or more packets, the number of packets included in the plurality of packets correlates with the maximum bandwidth per flow.

7. The method according to claim 1, further comprising the intermediate node replacing and/or updating the encoded information regarding the maximum bandwidth per flow prior to forwarding the one or more packets, if the second maximum bandwidth per flow is lower than the first maximum bandwidth per flow.

8. The method according to claim 1, wherein the calculating a maximum bandwidth per flow (Rpf) using the utilized bandwidth (BW), a predefined target bandwidth (U) and a previously calculated maximum bandwidth per flow (Rpf_p) is performed in accordance with the following equation:

$Rpf = U \times Rpf\_p / BW$.

9. The method according to claim 8, further comprising estimating a number of flows (#f) per link in accordance with the following equation:

$\#f = BW / Rpf\_p$.

10. The method according to claim 8, further comprising:
estimating the number of highly responsive flows or barely responsive flows, or the bandwidths utilized by the highly responsive flows or the barely responsive flows, wherein
the calculating of the maximum bandwidth per flow of the highly responsive flows is performed based on a difference between the target bandwidth and a previously determined utilized bandwidth.

11. The method according to claim 10, further comprising determining a number of highly responsive flows (#fa) per link using a difference between the previously calculated maximum bandwidth per flow (Rpf_p) and a third maximum bandwidth per flow (Rpf_pp) calculated previously to the previously calculated maximum bandwidth per flow, and a difference between a previously determined utilized bandwidth (BW_p) and a currently determined utilized bandwidth (BW), in accordance with the following equation:

$\#fa = (BW - BW\_p)/(Rpf\_p - Rpf\_pp)$ wherein the maximum bandwidth per flow is calculated in accordance with the following equation:

$Rpf = (U - BL)/\#fa$ wherein BL is the combined bandwidth of the barely responsive flows, which is computed in accordance with the following equation:

$BL = BW - \#fa \times Rpf\_p$.

12. The method according to claim 1, wherein
the intermediate node is communicatively coupled to a plurality of different next nodes corresponding to different paths using respective links, each link being capable of accommodating a plurality of flows, wherein the method for avoiding latency is separately performed per link.

13. A method for operating a receiving node for a packet-switched network, the network comprising a sending node, the receiving node, and a plurality of intermediate nodes, the intermediate nodes being mutually coupled by a plurality of links thereby forming paths for routing of packet flows between sending nodes including the sending node and receiving nodes including the receiving node, the method comprising:

receiving one or more packets having encoded therein information regarding a maximum bandwidth per flow;

extracting the information per flow after the one or more packets are separated per flow; and communicating the maximum bandwidth per flow to at least one sending node that has sent the one or more packets.

14. A method for operating a sending node for a packet-switched network, the network comprising the sending node, a receiving node, and a plurality of intermediate nodes, the intermediate nodes being mutually coupled by a plurality of links thereby forming paths for routing of packet flows between sending nodes including the sending node and receiving nodes including the receiving node, the method comprising:

receiving one or more packets corresponding to a packet flow having encoded therein information regarding a maximum bandwidth per flow;

extracting the information; and pacing packets to be sent to a next node, which packets belong to the packet flow, wherein the pace at which packets are sent is set in accordance with the maximum bandwidth per flow.

* * * * *